(12) United States Patent
Riphagen

(10) Patent No.: US 9,882,627 B2
(45) Date of Patent: Jan. 30, 2018

(54) SYSTEM FOR DYNAMICALLY CONTROLLING THE GAIN OF A REPEATER

(71) Applicant: Nextivity, Inc., San Diego, CA (US)

(72) Inventor: Ian Riphagen, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

(21) Appl. No.: 15/092,564

(22) Filed: Apr. 6, 2016

(65) Prior Publication Data
US 2016/0294467 A1   Oct. 6, 2016

Related U.S. Application Data

(60) Provisional application No. 62/143,736, filed on Apr. 6, 2015.

(51) Int. Cl.
*H04W 4/00* (2009.01)
*H04B 7/155* (2006.01)
*H04W 16/26* (2009.01)
*H04W 84/04* (2009.01)

(52) U.S. Cl.
CPC ........ *H04B 7/15535* (2013.01); *H04W 16/26* (2013.01); *H04W 84/047* (2013.01); *Y02B 60/50* (2013.01)

(58) Field of Classification Search
CPC ............ H04B 7/15585; H04B 7/15535; H04B 7/2606; H04B 7/155; H04B 7/15578; H04B 7/15571; H04B 7/15; H04B 7/15528; H04B 7/15507; H04B 7/0413; H04B 7/10; H04B 7/15564; H04B 7/15542; H04B 17/40
USPC .......... 455/7, 11.1, 25, 63.1, 10, 422.1, 424, 455/446; 370/315, 252, 279; 375/211, 375/214, E1.002
See application file for complete search history.

(56) References Cited

U.S. PATENT DOCUMENTS

| | | | |
|---|---|---|---|
| 2002/0141517 A1 | 10/2002 | Hayashi | |
| 2004/0110475 A1* | 6/2004 | Korol | H04W 52/52 455/126 |
| 2008/0076437 A1 | 3/2008 | Wilson et al. | |
| 2009/0196215 A1 | 7/2009 | Sabat et al. | |
| 2012/0314647 A1* | 12/2012 | Gore | H04B 7/15542 370/315 |

(Continued)

*Primary Examiner* — Fred Casca
(74) *Attorney, Agent, or Firm* — Mintz Levin Cohn Ferris Glovsky and Popeo, P.C.

(57) ABSTRACT

A repeater configured to dynamically affect the gain level of the repeater in response to the input signal power level over time. The repeater system includes a gain hold processor executing a gain hold algorithm. The gain hold algorithm preempts a large up-step in signal power level to follow a large down-step in signal power level. After a large up-step in input signal is detected, the system holds the gain level in response to a drop in input signal level after the large up-step. The gain is held at the level set by the large burst of input signal power to the repeater. In response to a larger up-step in signal power level, the system will lower the gain. In response to a large down-step in signal power after the larger up-step in signal power level, the system will hold the gain level of the repeater. During a prolonged low-power level or zero power signal at the input of the repeater, the system will slowly raise the gain level of the repeater over time.

15 Claims, 2 Drawing Sheets

(56) References Cited

U.S. PATENT DOCUMENTS

2013/0072112 A1* 3/2013 Gunnarsson ......... H04B 7/2606
455/9
2016/0047915 A1* 2/2016 Raasakka ................ G01S 19/21
342/357.59

* cited by examiner

US 9,882,627 B2

SYSTEM FOR DYNAMICALLY CONTROLLING THE GAIN OF A REPEATER

CROSS-REFERENCE TO RELATED APPLICATION

This application claims priority to and the benefit of U.S. Provisional Patent Application No. 62/143,736, filed on Apr. 6, 2015 and titled "SYSTEM FOR DYNAMICALLY CONTROLLING THE GAIN OF A REPEATER," the disclosure of which is incorporated by reference in its entirety.

TECHNICAL FIELD

The subject matter described herein relates generally to the field of wireless communication and data networks. More particularly, in one exemplary embodiment, the disclosure is directed to dynamically controlling the gain of a repeater.

BACKGROUND AND SUMMARY

Existing cellular networks, such as (Global System for Mobile Communications (GSM) and IS95, are intended to provide contiguous and continuous coverage for cellular communication terminals, so as to support a high terminal mobility expected from such systems. However, despite careful network design, indoor (in-building) coverage, or the coverage of places with high shadowing attenuation (e.g. tunnels) of such networks is often "patchy", with coverage "holes" at best, and no coverage at worst.

One main reason for the impaired indoor coverage is that cellular base stations are usually placed outside buildings, at positions that are typically higher than the average building heights, to provide large area coverage. Although the signal may be adequate at street-level, it is severely attenuated by a building's material as it passes through such buildings, reducing the signal power in-building, resulting in poor coverage. Loss of signal power (attenuation) depends on the building material and can be tens of decibels (dBs) for each wall penetration. The problem is exacerbated in third generation systems such as Wideband Code Division Multiple Access (WCDMA) and cdma2000, as these new systems have the capability of high data transmission, which results in lower information bit energy (Eb), and much reduced link budget and cellular footprint.

Typical solutions for providing indoor coverage are expensive and involve extensive investment in the cellular network infrastructure and are much more complex in planning and operation. One solution involves the use of a cellular repeater. Typically, repeaters operate in a manner that does not harm and/or effect the operations of the wireless communications network in which it operates. One of the fundamental tasks performed by a repeater for operating in such a manner is controlling the gain of the repeater. The repeater controls its gain to avoid increasing the interference levels in the wireless communications network. Typical repeater systems react to events in the wireless communications network much slower than the occurrence of those events, such as, for example, the start of a signal transmission in the uplink.

The output power level of a repeater is equal to the power at the input to the repeater plus the gain of the repeater. For example, if the repeater gain is 80 dB, and the input to the repeater is −80 dBm, the output power level of the repeater will be −80 dBm+80 dB=0 dBm. When the power at the input changes, the repeater will adjust its gain to either keep the power at output level, or to adjust the power at output to higher or lower, as necessary. If the input level to the repeater changes suddenly, typical repeaters do not have time to adjust their gain to achieve these outcomes.

Sudden changes in the power at input happen is when a handset initiates a call to the base station. During the initial part of this process called the Random Access phase, the handset will send out short bursts of information at ever increasing levels. The repeater's receiver gain needs to adjust to the changing input levels to ensure that the output signal for the repeater is not compromised by saturation of the input. After a large up-step in input signal power is detected, typical repeaters will increase their front-end gain in response to a drop in input signal power level to maintain the output signal power level.

SUMMARY

This document describes a system and method for pre-empting large up-steps in signal power levels that follow large down-steps in signal power levels. In one aspect, a repeater is described, having logic that executes an algorithm to dynamically control the repeater's gain, and holds the gain at the level set by the large burst of input signal power to the repeater, prior to the drop. In other words, no gain adjustment is made when an input signal power level drop is large, activating gain hold. The presently disclosed repeater having the presently disclosed algorithm implements a Gain-hold algorithm and overcomes the challenges of the prior art repeaters.

In another aspect, a repeater system and method is configured to dynamically override normal automatic gain control (AGC) behavior in response to specific steps in input power to the repeater. The repeater system can re-enable standard router/AGC behavior in response to specific predetermined input power levels at the input to the repeater. The system may freeze the input gain of a repeater when no input signal is present. The presently disclosed system may ramp the gain of a repeater slowly to the pre-determined level following an extended period of time without any input signal. The presently disclosed system may determine the timing and rate of change of the input gain settings when coming out of gain hold, based on the type of signals being boosted (e.g. LTE or WCDMA).

The details of one or more variations of the subject matter described herein are set forth in the accompanying drawings and the description below. Other features and advantages of the subject matter described herein will be apparent from the description and drawings, and from the claims. Certain features of the currently disclosed subject matter are described for illustrative purposes only and it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
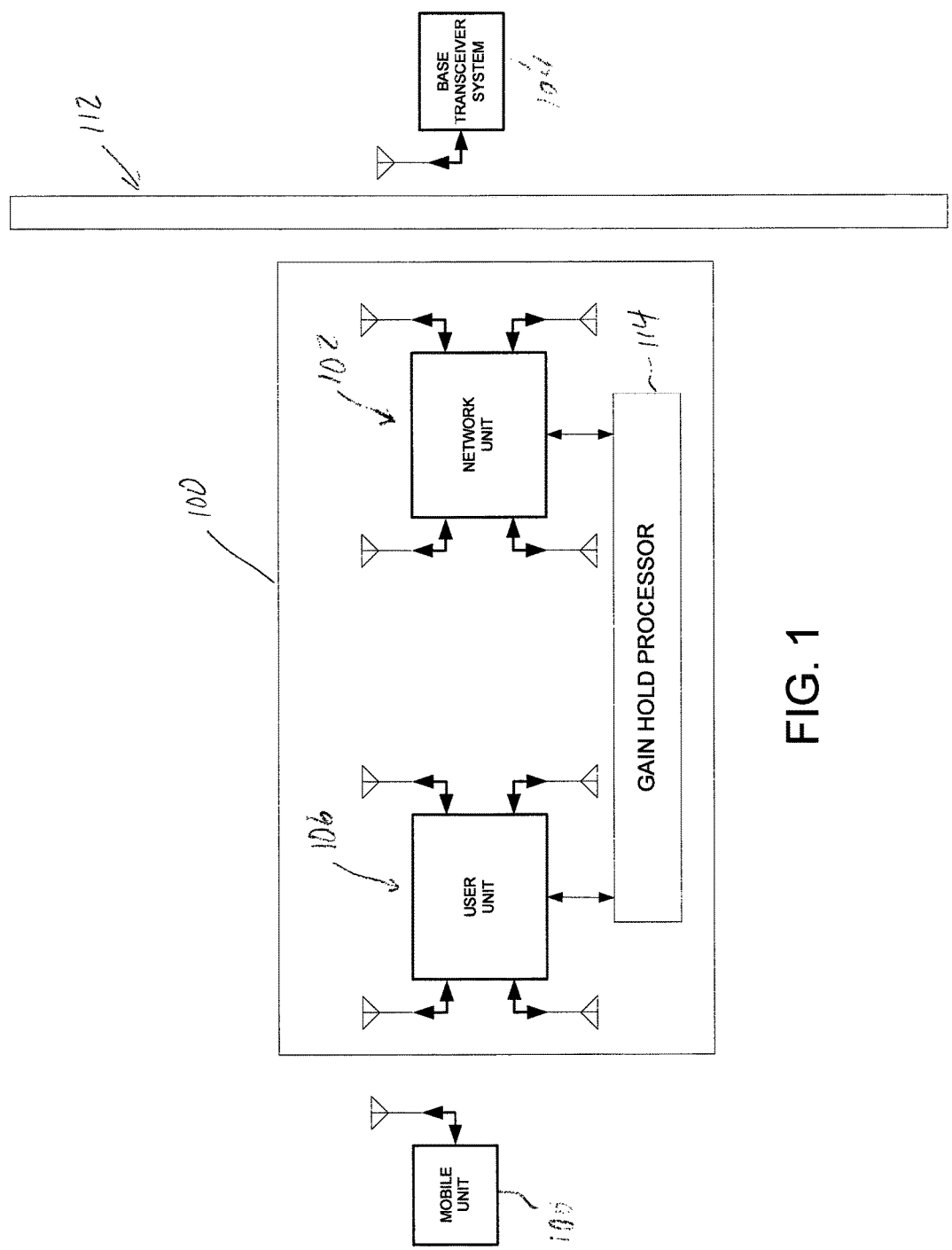
FIG. 1 illustrates a cellular repeater with a gain hold processor.

FIG. 1 illustrates a cellular repeater 100 having a network 102 having a donor antenna adapted to communicate with one or more base transceiver systems 104 (or "base station"), and a user unit 106 having a server antenna adapted to communicate with a mobile unit 108. Examples of the mobile unit 108 include wireless communication devices such as a cellular phone, laptop computer, desktop computer, tablet computer, or personal digital assistant (PDA). Thus, the cellular repeater 100 is suited for an environment such as a home or building 112, to receive signals from the selected base station 104, boost, or add gain to, the signals, and send the boosted signals to the mobile unit 108, and back again from the mobile unit 108 to the selected base station 104.

The cellular repeater further includes a gain hold processor 114 that is configured for preempting large up-steps in signal power levels that follow large down-steps in signal power levels of signals received by the cellular repeater 100. The gain hold processor 114 includes logic that executes an algorithm to dynamically control the gain of the cellular repeater 100, and holds the gain at the level set by the large burst of input signal power to the cellular repeater, prior to the drop. Accordingly, the gain hold processor 114 activates gain hold and makes no gain adjustment when an input signal power level drop at the cellular repeater 100 is large.

The gain hold processor 114 is further configured to dynamically override normal automatic gain control (AGC) behavior in response to specific steps in input power to the cellular repeater 100. The gain hold processor 114 can re-enable standard router/AGC behavior in response to specific pre-determined input power levels at the input to the repeater. The gain hold processor 114 freezes the input gain of the cellular repeater 100 when no input signal is present, and ramps up the gain of the cellular repeater 100 slowly to the pre-determined level following an extended period of time without any input signal to the cellular repeater 100. The gain hold processor 114 is further configured to determine the timing and rate of change of the input gain settings when coming out of gain hold, based on the type of signals being boosted, e.g. LTE or WCDMA, for example.

Figure 2:
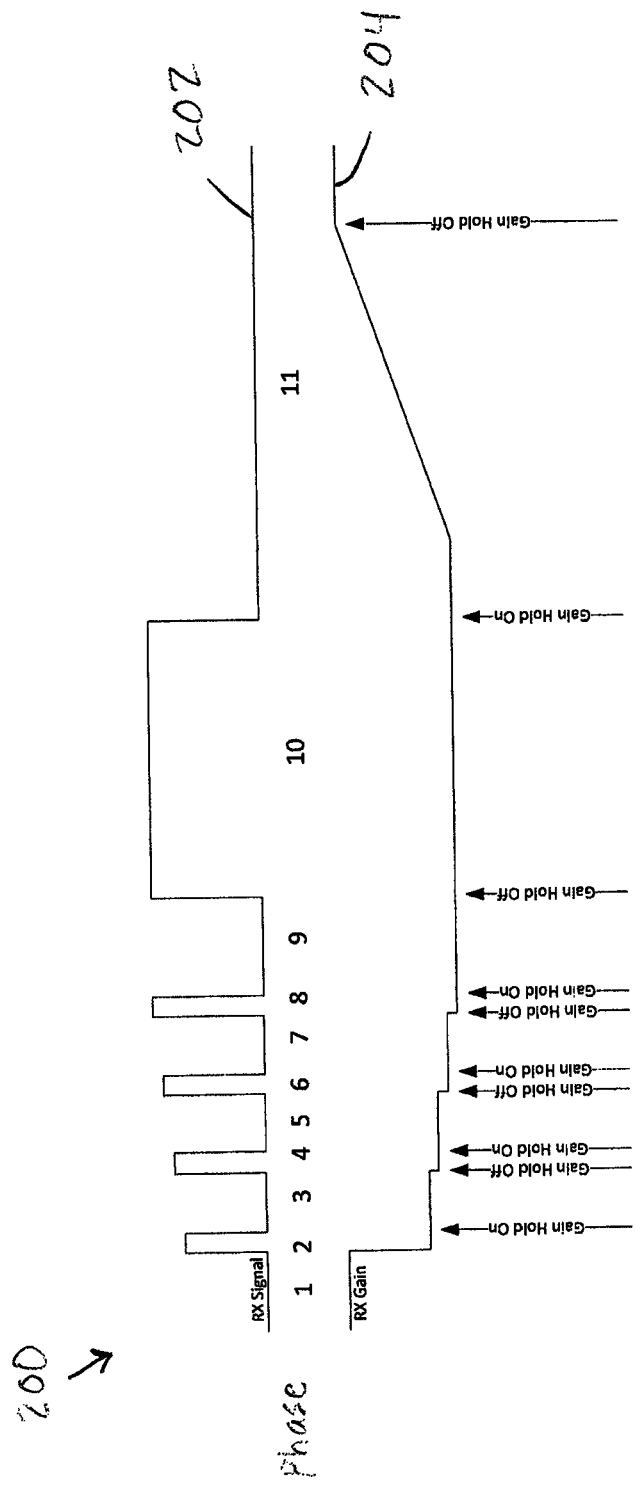
FIG. 2 is a diagram illustrating the process performed by a system having features consistent with implementations of the current subject matter.

FIG. 2 is a diagram 200 for illustrating the effect of a Gain Hold Algorithm implemented by a gain hold processor of a cellular repeater (hereinafter "repeater"), and having features performed by a system consistent with implementations of the current subject matter. The diagram 200 illustrates an input signal power level 202. The diagram 200 illustrates a gain level 204 of the repeater, caused by a gain hold algorithm executed by a gain hold processor.

At phase 1, the input signal power level 202 into the repeater is low. Consequently, the AGC will set the Rx gain level 204 to a high level to have the appropriate input signal level into the repeater. At phase 2, an abrupt increase in the input signal power level 202 is seen at the input to the repeater. This abrupt increase in the input signal power level 202 causes the AGC algorithm to reduce the input gain of the repeater. When this burst is completed, dynamic gain hold is activated and the receive gain of the repeater is kept constant. This is the case even though the input signal power level 102 is at a low level. The signal gain level 204 remains constant all through phase 3. At phase 4, a burst, bigger than the burst at phase 2, is seen. The gain hold, which aids in dynamically adjusting the gain of the repeater, is removed. The removal of the gain hold allows the repeater and/or the AGC to adjust the gain to an appropriate level for the observed signal power level at phase 4. This process is repeated through phases 4 to 10.

Phase 11 illustrates where the signal power level remains low for an extended period. During phase 11, the repeater starts to ramp up the receiver gain. Ramping up the receiver gain prepares the repeater for reception of lower signal power levels. The point where the repeater starts to ramp up the signal gain, and the rate at which the repeater ramps up the signal gain, varies based on the type of signals being repeated and is generally under software control.

The repeater is configured to dynamically change the level of gain may include one or more physical computer processors configured to execute one or more computer program instructions. The one or more physical computer processors may be configured, by executing the one or more computer program instructions, to effect the dynamic change the level of gain of the repeater.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of operating a cellular repeater having a variable-gain donor antenna adapted to communicate with a base station, and a server antenna adapted to communicate with a mobile device, the method comprising:
   receiving, at the cellular repeater, a signal, the signal having an input signal power level, the input signal power level dynamically changing;
   setting, at the cellular repeater, a gain of an amplifier to a predetermined first level, the amplifier configured to modify the input signal power level of the signal;
   detecting, at the cellular repeater, an increase in the input signal power level of the signal during receipt, at the cellular repeater, of a first data burst;
   dropping, at the cellular repeater and in response to the detecting, the gain of the amplifier from the predetermined first level to a second level less than the predetermined first level, the dropping of the gain of the amplifier being over one or more cycles of the signal;
   holding the gain of the amplifier at the second level until receipt of a second data burst having the input signal power level: and
   gradually increasing the gain of the amplifier from the second level to the predetermined first level in response to an expiration of a period of time during which no signal is received at the cellular repeater.

2. The method in accordance with claim 1, wherein a data burst is defined by a predetermined burst time period.

3. The method in accordance with claim 2, further comprising holding the gain of the amplifier in response to an increase to the input signal power level taking longer than the predetermined burst time period.

4. The method in accordance with claim 1, wherein the second level is a predetermined level.

5. The method in accordance with claim 4, wherein the predetermined second level is based on the input signal power level during a data burst.

6. A system comprising:
   a cellular repeater having a variable-gain donor antenna adapted to communicate with a base station, and a server antenna adapted to communicate with a mobile device;
   at least one programmable processor; and
   a machine-readable medium storing instructions that, when executed by the at least one programmable processor, cause the at least one programmable processor to operate the cellular repeater to at least:
   receive, at the cellular repeater, a signal having an input signal power level, the input signal power level dynamically changing; and
   set, at the cellular repeater, a gain at the variable-gain donor antenna to a predetermined first level, an amplifier configured to modify the first input signal power level of a first signal;
   detect, at the cellular repeater, an increase in the input signal power level of the signal during receipt of a first data burst;
   drop, at the cellular repeater and in response to the detection, gain of the amplifier from the predetermined first level to a second level less than the predetermined first level, the drop of the gain of the amplifier being over one or more cycles of the signal;
   hold the gain of the amplifier at the second level until receipt of a second data burst having the input signal power level; and
   gradually increase the gain of the amplifier from the second level to the predetermined first level in response to an expiration of period of time during which no signal is received at the cellular repeater.

7. The system in accordance with claim 6, wherein a data burst is defined by a predetermined burst time period.

8. The system in accordance with claim 7, wherein the cellular repeater is further configured to at least hold the gain of the amplifier in response to an increase to the input signal power level taking longer than the predetermined burst time period.

9. The system in accordance with claim 6, wherein the second level is a predetermined level.

10. The system in accordance with claim 9, wherein the predetermined second level is based on the input signal power level during a data burst.

11. A system comprising:
    a cellular repeater having a variable-gain donor antenna adapted to communicate with a base station, and a server antenna adapted to communicate with a mobile device, the cellular repeater receiving a signal having a dynamically-changing input signal power level; and
    a gain hold processor comprising logic to dynamically control a gain of the received signal by the cellular repeater based on the input signal power level;
    the gain hold processor being configured to at least:
    set gain of an amplifier to a predetermined first level;
    detect an increase in the input signal power level of the signal during receipt of a first data burst;
    drop, at the cellular repeater and in response to detection, the gain of the amplifier from the predetermined first level to a second level less than the predetermined first level, the drop of the gain being over one or more cycles of the signal;

hold the gain of the amplifier at the second level until receipt of a second data burst having the input signal power level; and gradually increase the gain of the amplifier from the second level to the predetermined first level in response to an expiration of a period of time during which no signal is received at the cellular repeater.

12. The system in accordance with claim 11, wherein a data burst is defined by a predetermined burst time period.

13. The system in accordance with claim 12, wherein the gain hold processor is further configured to at least hold the gain of the amplifier in response to an increase to the input signal power level taking longer than the predetermined burst time period.

14. The system in accordance with claim 11, wherein the second level is a predetermined level.

15. The system in accordance with claim 14, wherein the predetermined second level gain drop amount is based on the input signal power level during a data burst.

* * * * *